US006182808B1

United States Patent
Walton et al.

(10) Patent No.: US 6,182,808 B1
(45) Date of Patent: Feb. 6, 2001

(54) VISCOUS ACTUATED BALL RAMP CLUTCH HAVING THROUGH SHAFT CAPABILITY

(75) Inventors: Erlen B. Walton, Farmington Hills; Michael W. Nank, Eastpointe, both of MI (US); William N. Eybergen, Windsor (CA); James K. Spring, Brighton, MI (US)

(73) Assignee: Eaton Corporation, Cleveland, OH (US)

( * ) Notice: Under 35 U.S.C. 154(b), the term of this patent shall be extended for 0 days.

(21) Appl. No.: 09/237,427

(22) Filed: Jan. 26, 1999

Related U.S. Application Data

(63) Continuation-in-part of application No. 09/109,354, filed on Jul. 2, 1998, which is a continuation-in-part of application No. 08/865,901, filed on May 30, 1997, now abandoned.

(51) Int. Cl.[7] .............................. F16D 13/04; F16D 3/00; F16D 41/00; F16D 43/00
(52) U.S. Cl. .................... 192/35; 192/54.1; 192/54.5; 192/58.4; 192/58.41
(58) Field of Search .................... 192/35, 58.11, 192/85 A, 57, 54.52; 74/665, 650

(56) References Cited

U.S. PATENT DOCUMENTS 5,036,963 * 8/1991 Murata .................................. 192/35
5,890,573 * 4/1999 Kwoka .................................. 192/35

* cited by examiner

Primary Examiner—Charles A. Marmor
Assistant Examiner—Tisha D. Waddell
(74) Attorney, Agent, or Firm—L. J. Kasper

(57) ABSTRACT

A differential device (11) of the type including a clutch pack (23), engaged by a ball ramp actuator (21), which is initiated by a viscous coupling (19;101). The output of the device (11) is an output shaft (13) which is hollow and extends through the entire axial extent of the device. The viscous coupling (19;101) includes, in the embodiment of FIG. 1, an annular input coupling member (25) and an annular output coupling member (27), within the input member, to define therebetween a cylindrical viscous shear chamber (29). The output coupling member (27) at least partially surrounds the first ramp plate (41) of the ball ramp actuator (21), and is in driving engagement therewith, for improved packaging. The clutch pack (23) and the actuator (21) are disposed about the output shaft (13) and axially retained between snap rings (55,93), so that all axial separation forces generated within the clutch pack and the actuator are taken up within a single member, such as the output shaft (13), rather than being exerted on the connection of the housing (17) and the end cap (15). In the FIG. 5 embodiment, the viscous coupling (101) is in driven engagement with the inner periphery of the first ramp plate (41), with the viscous coupling being of the type including interleaved plates (107,109).

9 Claims, 4 Drawing Sheets

VISCOUS ACTUATED BALL RAMP CLUTCH HAVING THROUGH SHAFT CAPABILITY

CROSS-REFERENCE TO RELATED APPLICATIONS

This application is a continuation-in-part (CIP) of co-pending application U.S. Ser. No. 09/109,354, filed Jul. 2, 1998, in the name of Erlen B. Walton for a "VISCOUS ACTUATED BALL RAMP CLUTCH", which is a CIP of U.S. Ser. No. 08/865,901, filed May 30, 1997, abnd in the name of Erlen B. Walton for a "VISCOUS ACTUATED BALL RAMP CLUTCH".

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a driveline system for a four wheel drive vehicle, and more particularly, to a differential device for use in such a driveline system. The use of the term "differential" does not imply the presence of conventional differential gearing, but instead, the term is used primarily because the device of the present invention replaces the typical prior art center differential. However, it should be understood that the device illustrated, described and claimed herein has uses other than as a center differential in a four wheel drive vehicle driveline.

In many of the vehicles being produced today, the basic vehicle platform is a front wheel drive. However, in many such vehicles, especially in vans and sport utility vehicles, it is considered desirable to be able to provide four wheel drive, at least under certain operating conditions.

Typically, the various arrangements for achieving part-time four wheel drive have been complex and expensive, and in some cases, have required some sort of control scheme to achieve the four wheel drive (or rear wheel drive) in response to certain predetermined operating conditions.

In certain vehicle applications, it is acceptable to provide only front wheel drive under most operating conditions, and rear wheel drive is required only when the front drive wheels are slipping (e.g., under poor traction conditions). However, the prior art has not provided a suitable device wherein only front wheel drive is provided, with no substantial torque being transmitted to the rear wheels, until the front wheels begin to slip. For example, U.S. Pat. No. 4,562,897 discloses a viscous clutch in the driveline, between the front transaxle and the rear wheels, but requires a selector arrangement in order to choose among transmitting torque through the viscous coupling, or disconnecting the viscous coupling, or bypassing the viscous coupling.

It is known from U.S. Pat. No. 5,070,975 and from corresponding European Application EP 0 314 420 to use, as a center differential in a four wheel driveline, a viscous actuated ball ramp type friction clutch to transmit torque to the rear axles when there is a speed difference between the front and rear wheels. It is believed that the torque transmitting capability of the device of the cited patent and application would be somewhat limited by the fact that one of the ball ramp plates comprises the input to the viscous coupling.

In certain vehicle applications for four wheel drive drivelines, the differential device must be capable of a "through-shaft" configuration, which the known, prior art devices have not been. It should be understood that, as used herein, the term "through-shaft" is not limited to an arrangement in which there are two concentric shafts extending completely through the differential device, but instead, includes an arragement in which there is an output shaft, or some equivalent member, disposed within, and surrounded by, the differential device, over at least most of the axial length of the differential device.

BRIEF SUMMARY OF THE INVENTION

Accordingly, it is an object of the present invention to provide an improved differential device which is capable of use in a "through-shaft" configuration.

It is a more specific object of the present invention to provide an improved differential device which accomplishes the above-stated object, and which includes additional features which facilitate such a through-shaft configuration.

The above and other objects of the invention are accomplished by the provision of an improved differential device of the type including an input adapted to receive input torque, an output adapted to provide driving torque to an output device, and a clutch pack including at least a first friction disc fixed to rotate with the input, and at least a second friction disc fixed to rotate with said output. The device includes means operable to move said friction discs between a disengaged position and an engaged position, said means comprising a cam ramp actuator including first and second ramp plates, and a plurality of cam members, each operably disposed between said first and second ramp plates, and in engagement with first and second ramp surfaces, respectively. The second ramp plate is disposed axially adjacent the friction discs and is operable to move the friction discs toward the engaged position. The means operable to move said friction discs further comprises a viscous coupling including an input coupling member fixed to rotate with said input, and an output coupling member.

The improved differential device is characterized by the output comprising an elongated, generally hollow shaft member extending axially through substantially the entire axial extent of the differential device. The device includes means for interconnecting one of the input coupling member and the output coupling member of the viscous coupling with the first ramp plate for common rotation.

In accordance with another aspect of the invention, the improved differential device is characterized by the output comprising a shaft member extending axially through the clutch pack and at least partially through the cam ramp actuator. A first retention means is in engagement with one of the input and the shaft member and operable to limit axial movement of the first ramp plate in a forward direction, relative to one of the input and the shaft member. As a result, substantially all axial separation forces within the clutch pack and the cam ramp actuator are taken up within either the input or the shaft member.

In accordance with yet another aspect of the invention, the improved differential device is characterized by one of the input and the output defining a plurality N of elongated cut-out portions on the periphery thereof. One of the first friction disc and the second friction disc defines a plurality N of cut-out portions cooperating with the elongated cut-out portions defined by the one of the input and the output to define a plurality N of openings. There is a plurality N of elongated members, each member being disposed in one of the openings, and operable to transmit torque between the one of the first friction disc and the second friction disc and the one of the input and the output. The openings have an axial length L1, and each of the elongated members has an axial length L2, less than L1, the difference therebetween being selected such that wear within the clutch pack will permit L1 to decrease to L2, but will prevent the cam ramp actuator from moving to an over-center condition.

DETAILED DESCRIPTION OF THE PREFERRED EMBODIMENT

Figure 1:
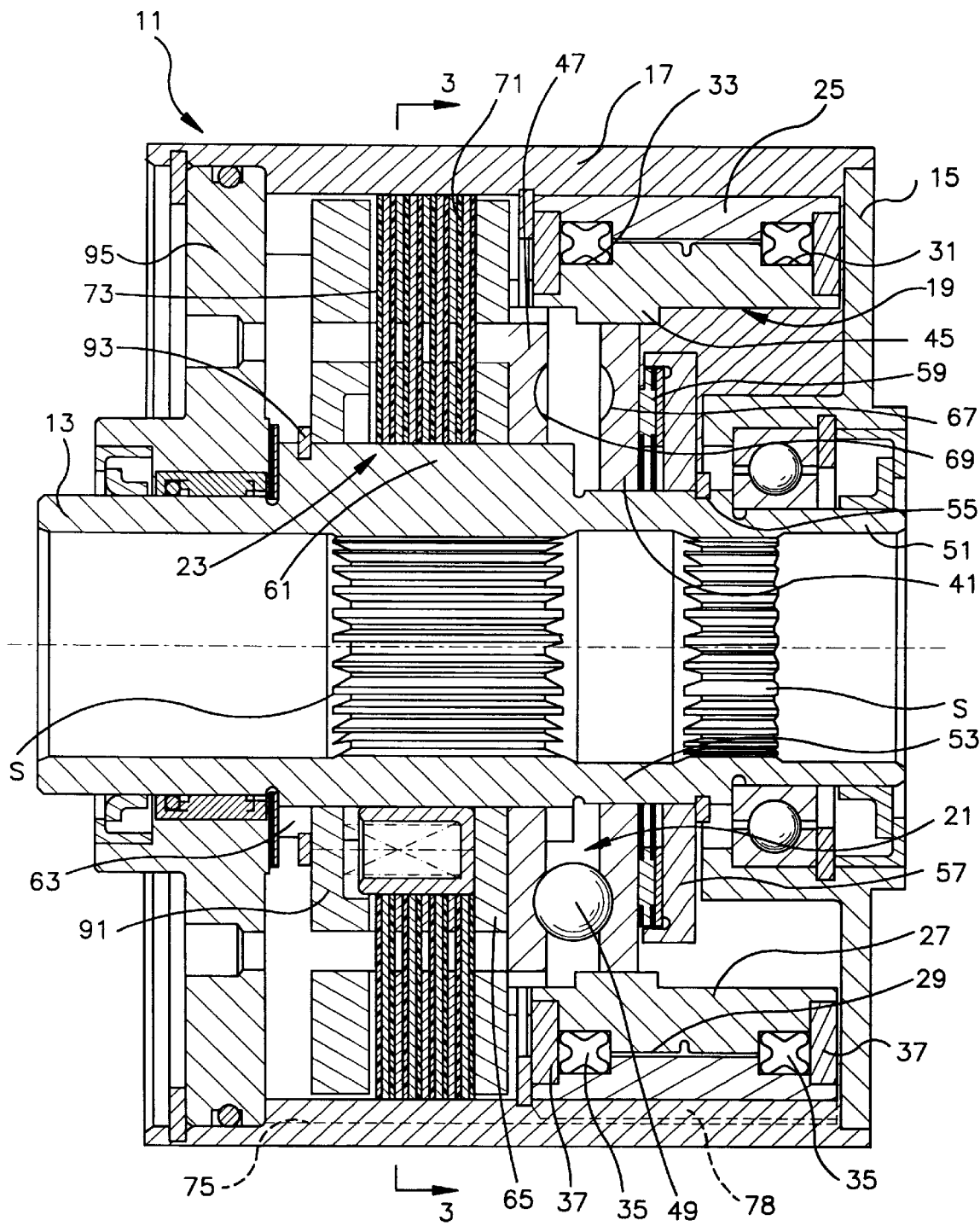
FIG. 1 is an axial cross-section of the differential device made in accordance with the present invention.

Referring now to the drawings, which are not intended to limit the invention, FIG. 1 is an axial cross-section of a differential device, generally designated 11, for use in a driveline system for a four wheel drive vehicle, not illustrated herein, but which is illustrated and described briefly in co-pending application U.S. Ser. No. 09/109,354, filed Jun. 2, 1998 in the name of Erlen B. Walton for a "VISCOUS ACTUATED BALL RAMP CLUTCH".

Although the invention is not so limited, the differential device 11 would typically be used as a center differential, and would receive input torque from a front transaxle of the vehicle (disposed to the right in FIG. 1) and would transmit output torque to a rear differential assembly (to the left in FIG. 1).

In the subject embodiment, input torque is transmitted to a forward end cap 15, also referred to hereinafter as part of the "input", while output torque is transmitted from the differential device 11 by means of an output shaft 13 to the rear differential. In many applications, the device 11 could be reversed, i.e., the shaft 13 could be the input and the forward end cap 15 could be the output, and therefore, the use herein of the terms "input" and "output" will be understood as explanatory, and not limiting. As was mentioned previously, it would be understood by those skilled in the art that the term "center differential device" does not mean or imply that the device include a conventional differential gear set, but instead, the term will be understood in its broader sense to mean that the device 11 will permit differentiating action between the input 15 and the output 13. In the subject embodiment, the front drive wheels of the vehicle are the primary drive wheels, and the rear drive wheels are only secondary drive wheels. However, within the scope of the present invention, such could be reversed, i.e., the rear wheels being the primary drive wheels and the front wheels being the secondary drive wheels.

Although the present invention will be described as though the front wheels and the rear wheels normally rotate at the same speed, as the vehicle is travelling straight ahead, those skilled in the art will understand that such is typically not the case. For various reasons, such as the fact that the front wheels normally have a smaller rolling radius, the front drive wheels typically rotate somewhat faster than the rear wheels. Therefore, in a typical drive system of the type utilizing the device 11, there is almost always at least some torque being transmitted by the device 11. As a result, the performance requirements for the device 11 are much more stringent than would be the case if the device merely rotated as a "solid" unit for most of its duty cycle.

Referring still primarily to FIG. 1, the differential device 11 will be described in some detail. The device 11 includes a housing 17 which may be made in accordance with the teachings of co-pending U.S. Ser. No. 149,991, filed Sep. 9, 1998 in the names of Wayne K. Leichliter and Erlen B. Walton for a "VISCOUS ACTUATED BALL RAMP CLUTCH AND IMPROVED HOUSING THEREFOR", assigned to the assignee of the present invention and incorporated herein by reference. However, the present invention is not limited to the housing and method of assembly illustrated and described in the cited co-pending application.

Disposed within the housing 17, which may also be considered part of the input, the differential device 11 may be viewed as comprising three separate portions as follows: a viscous coupling 19; a ball ramp actuator 21; and a clutch pack 23. It is one important feature of the device of the present invention that these portions comprise separate, somewhat functionally independent devices, except to the extent noted otherwise hereinafter.

The viscous coupling 19 includes an input coupling member 25, which is fixed to rotate with the housing 17, in a manner to be described subsequently. The viscous coupling 19 also includes an output coupling member 27, such that the members 25 and 27 cooperate to comprise a totally functional, self-contained viscous coupling, which defines a viscous shear chamber 29. Both of the coupling members 25 and 27 are generally annular, and therefore, the viscous shear chamber 29 is generally cylindrical. Toward their opposite, axial ends, the input and output coupling members 25, 27 cooperate to define forward and rearward annular seal chambers 31 and 33, and disposed within each of the chambers 31 and 33 is a seal member 35, illustrated herein by way of example only as a quad ring. Thus, the seal members 35 define the axial extent of the viscous shear chamber 29. Disposed at the extreme axial ends of the viscous coupling 19 is a pair of bushings 37, part of the function of which is to support the members 25 and 27 relative to each other, especially during times of relative rotation between the members 25 and 27.

Figure 2:
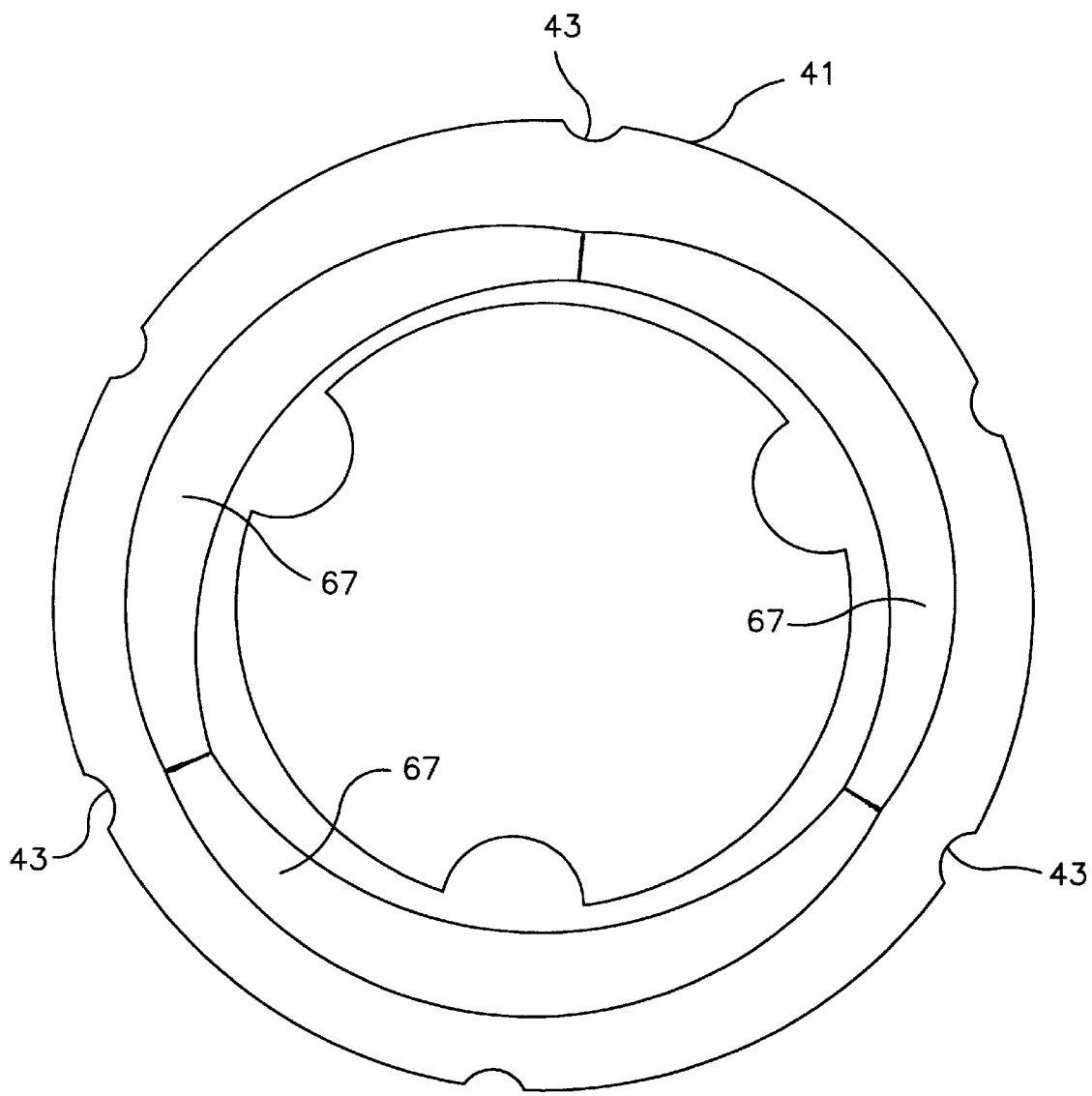
FIG. 2 is a transverse plan view of the input ramp plate, viewed from the left in FIG. 1, and on a slightly larger scale than FIG. 1.

In accordance with one important aspect of the invention, the generally annular configuration of the viscous coupling 19 makes it possible to improve the "packaging" of the differential device 11. By way of example only, the viscous coupling 19 is disposed in a generally surrounding relationship to at least part of the ball ramp actuator 21. More specifically, the ball ramp actuator 21 includes a first ramp plate 41, wherein FIG. 2 is a plan view of the ramp plate 41, viewed from the left in FIG. 1. The first ramp plate 41 includes a plurality of cut-out portions or notches 43 disposed about the outer periphery thereof, and as may best be seen in FIG. 1, the output coupling member 27 defines, about its inner periphery, a plurality of projections 45 which mate with the notches 43, whereby torque is transmitted from the output coupling member 27 to the first ramp plate 41, while at the same time, the first ramp plate 41 is able to move axially relative to the coupling member 27.

The ball ramp actuator 21 also includes a second ramp plate 47, and a plurality of balls 49, although it should be understood that any form of cam member may be used. Thus, the ball ramp actuator 21 is also referred to hereinafter and in the appended claims as a "cam ramp actuator".

Toward the forward end (right end in FIG. 1) of the output shaft 13 are several reduced diameter portions 51 and 53. The portion 51 is surrounded by the forward end cap 15, which also serves as the input to the device 11, in a manner well known to those skilled in the art. Disposed about the reduced diameter portion 53 is a snap ring 55. Disposed immediately adjacent the snap ring 55, and seated against it, is an annular retaining plate 57, and disposed axially between the plate 57 and the first ramp plate 41 is a thrust bearing set 59. It is significant that the bearing set 59 comprise a true "rolling" bearing, such as a needle-type bearing, although at least theoretically, a device such as a bronze bushing could be used if handling the axial loading were the only concern. The significance of the snap ring 55 and the retaining plate 57 will be described in greater detail subsequently.

Figure 3:
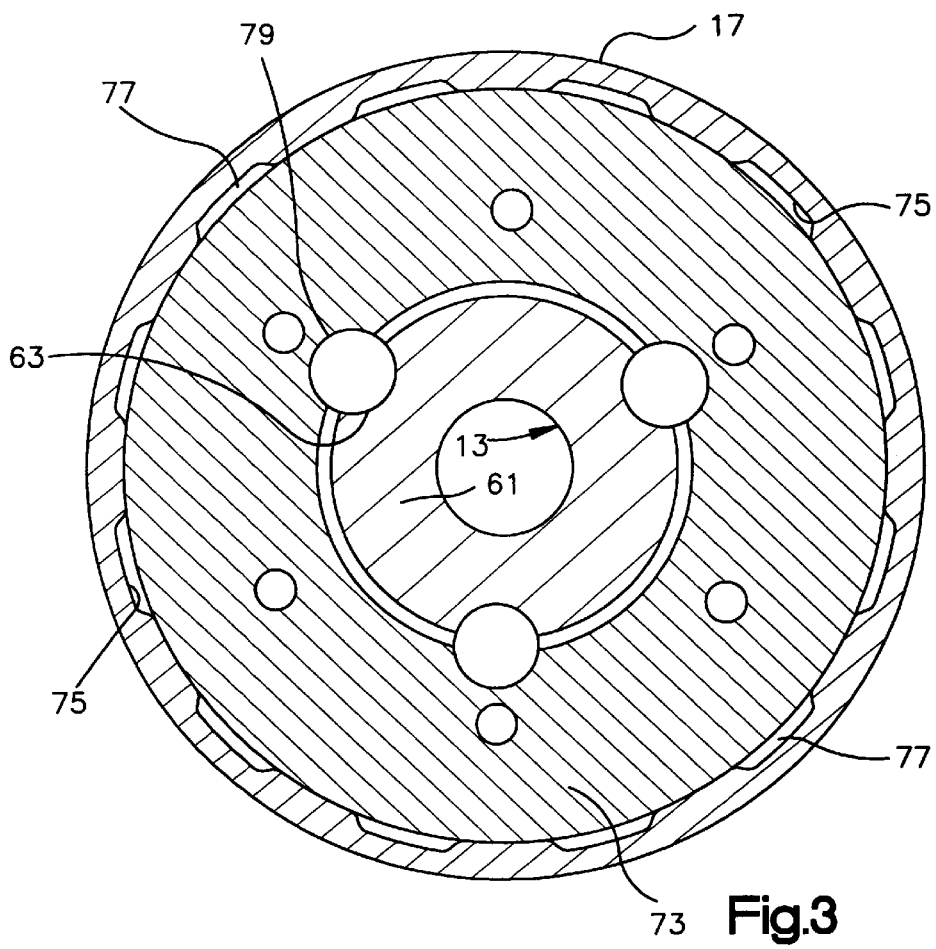
FIG. 3 is a transverse cross-section taken on line 3—3 of FIG. 1, and on a smaller scale than FIG. 1.

Referring now to FIG. 3, in conjunction with FIG. 1, the output shaft 13 includes a relatively larger diameter portion 61 which defines, about its outer periphery, a plurality of elongated, half-circular notches 63, and the second ramp plate 47 defines, about its inner periphery, a plurality of half-circular tabs 65, such that the second ramp plate 47 and the output shaft 13 rotate at the same speed. It should be understood that the particular shape illustrated for the notches 63 and the tabs 65 is by way of example only. In the subject embodiment, a number of the parts shown comprise powdered metal, wherein elements such as the notches 63 or the tabs 65 are formed in the powdered metal part, and are utilized as pressed, with no subsequent machining. Therefore, by way of example only, the output shaft 13 does not include any external splines. However, and also by way of example only, the output shaft 13 defines two sets of internal splines S, for splined engagement with a shaft (not shown herein) which would typically comprise the input shaft to the rear wheel inter-wheel differential. Typically, the unshown shaft would have a nut on its forward end, with the nut being trapped against the forward surface of the reduced diameter portion 51.

In a manner well known to those skilled in the art, the first ramp plate 41 defines a plurality of first ramp surfaces 67, while the second ramp plate 47 defines a plurality of second ramp surfaces 69. In FIG. 1, the ball ramp actuator 21 is shown in its "neutral" or centered position, i.e., each of the balls 49 is disposed in the "valley" of each of the ramp surfaces 67 and 69, such that the ramp plates 41 and 47 are at their minimum axial distance from each other, or stated another way, the overall axial dimension of the actuator 21 is at a minimum. As is also well known to those skilled in the art, the neutral position of the ball ramp actuator 21 would correspond, typically, to a disengaged condition of the clutch pack 23. Preferably, the first and second ramp surfaces 67 and 69 include first and second detents (not illustrated herein), which are generally understood in the art, such that a very definite, predetermined speed difference (slip speed) within the viscous coupling 19 must occur to initiate ramping of the actuator 21. Such ramping will not occur in response merely to the very slight differences which may occur in response to variations in factors such as tire size, etc.

Disposed immediately adjacent the second ramp plate 47 is the clutch pack 23, including a plurality of outer friction discs 71, and a plurality of inner friction discs 73, one of which is shown in FIG. 3. The outer friction discs 71 are in engagement with the housing 17 by means of a plurality of axially extending grooves 75 formed in the inner surface of the housing 17, and a plurality of mating ears 77 formed about the outer periphery of the outer discs 71. Preferably, the grooves 75 extend axially over most of the axial extent of the housing 17, as may best be seen in FIG. 1, and the input coupling member 25 includes axially extending ears or splines 78, which mate with the grooves 75, as the member 25 is merely slid into the position shown in FIG. 1. Thus, input torque is transmitted from the input 15 through the housing 17 to the input coupling member 25.

Figure 4:
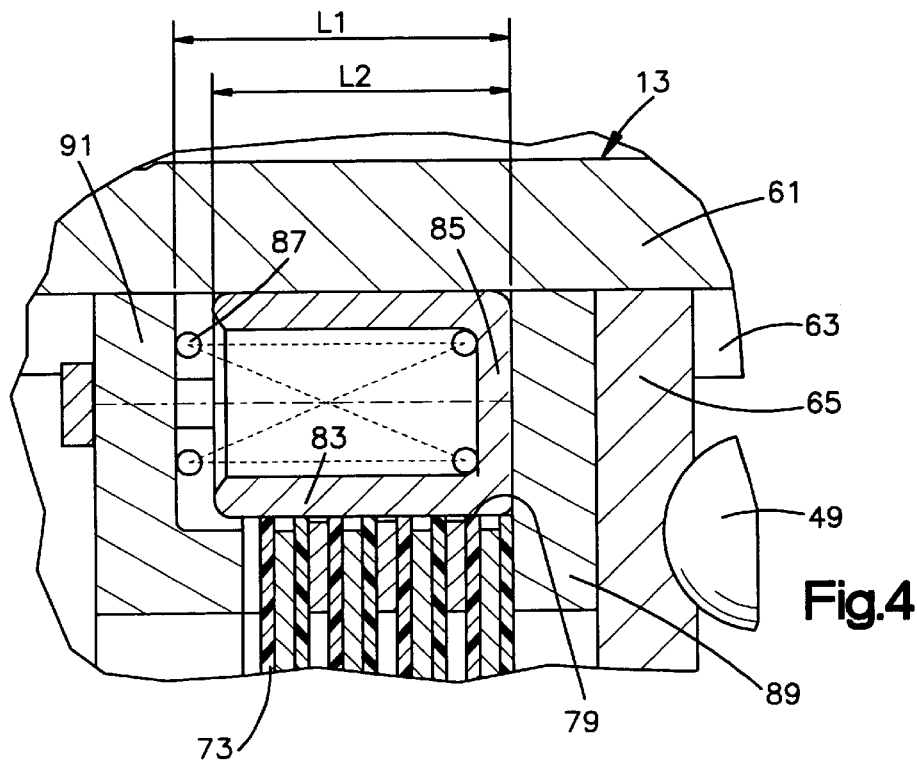
FIG. 4 is an enlarged, fragmentary, axial cross-section illustrating one feature of the present invention.

The inner friction discs 73 are in engagement with the output shaft 13 by means illustrated primarily in FIGS. 3 and 4. Each of the inner friction discs 73 defines a half-circular notch 79, and upon assembly, the notches 63 and 79 are aligned, rotationally, as shown in FIG. 3, and cooperate to define a cylindrical opening 81 (see FIG. 4). Disposed within each opening 81 is a generally cylindrical member 83 which, preferably has one end partially closed, as shown at 85 to provide a seat for a compression spring 87. The springs 87 bias the members to the position shown in FIG. 4, to keep the members 83 in engagement with the notches 79, but at the same time, the springs 87 are biasing an end plate 89 to the right, effectively biasing the ball ramp actuator 21 toward its neutral, centered position Thus, the cylindrical members 83 act as drive members to transmit torque from the friction discs 73 to the output shaft 13, without the need for machined splines, while the springs 87 bias the members 83 to their appropriate position, while also serving as the neutral centering springs, without being disposed within openings in the friction plates as has been done previously.

As may best be seen in FIG. 4, each of the openings 81 has an overall axial length L1, whereas each of the members 83 has an axial length L2, with the length L2 being somewhat less than the length L1. In accordance with one feature of the invention, the difference between the lengths L1 and L2 is selected small enough to be sure that the ball ramp actuator 21 can never move to an "over-center" condition, as is well understood by those skilled in the ball-ramp art. As the friction surfaces of the outer and inner friction discs 71 and 73 wear, the length L1 defined by the openings 81 will gradually decrease. If the members 83 were not present, the ball ramp actuator 21 could eventually have enough axial clearance, because of the wear of the clutch pack 23, that the ramp plates 41 and 47 could go over-center. In that case, each of the balls 49 would likely "cycle" in and out of the ramp surfaces on one of the plates 41 or 47, resulting in substantial noise, but not applying proper loading to the clutch pack. The length L2 of the members 83 is selected such that as the length of the openings L1 decreases with disc wear, the amount of disc wear is limited, as the length L1 of the openings can decrease to L2, but can never be less than the length L2 of the members 83.

As may best be seen in FIGS. 1 and 4, at the rearward end of the clutch pack 23 is another end plate 91, which preferably has on its inner periphery, tabs similar to the tabs 65 on the ramp plate 47, for engagement with the notches 63 on the output shaft 13. Disposed adjacent the end plate 91 is a snap ring 93, thus limiting rearward movement of the clutch pack 23 in the same manner as the snap ring 55 limits forward movement of the ball ramp actuator 21. Therefore, substantially all axial separation forces generated within the clutch pack 23 and within the actuator 21 are taken up within a single element, and in this embodiment, are taken up within the output shaft 13, which is suitably constructed for that purpose. None of the axial separation forces are transmitted to the housing 17, and thus, the assembly of the housing 17 and the end cap 15, and a rearward end cap 95 can be simplified and made substantially less expensive. As is well known to those skilled in the ball ramp clutch art, the separation forces within such devices can be several thousand pounds. The above-described "self-contained" feature, whereby both the clutch pack and the ball-ramp actuator are disposed between retention means on the output shaft, is not limited to use in a through-shaft configuration, but without the self-contained feature, the through-shaft design would be much more difficult to achieve, and the result may not be functionally satisfactory.

Figure 5:
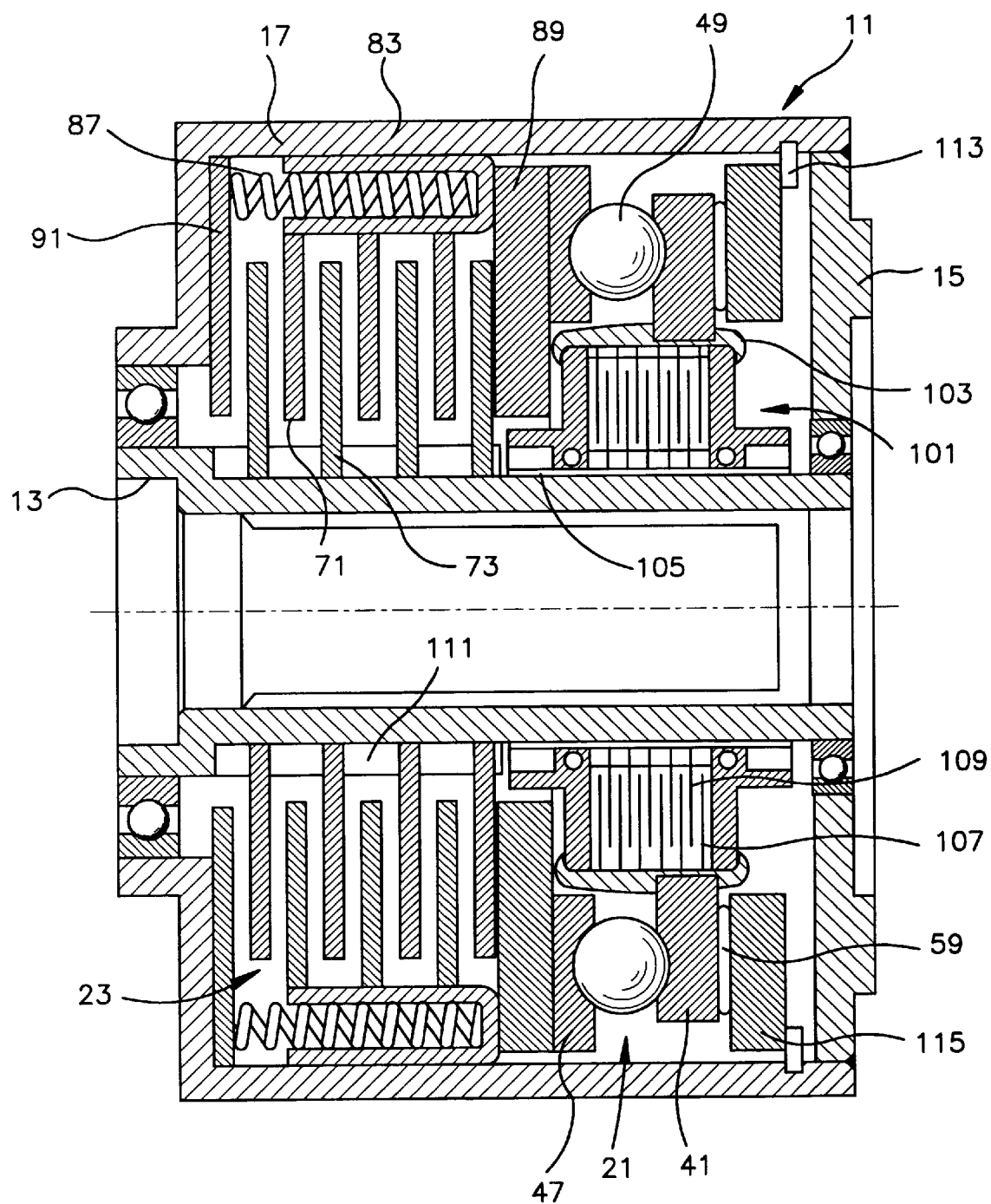
FIG. 5 is an axial cross-section of an alternative embodiment of the present invention.

Referring now primarily to FIG. 5, there is illustrated an alternative embodiment of the invention, wherein the same or similar elements will bear the same reference numerals as in the embodiment of FIGS. 1 through 4, and substantially different elements will bear reference numerals in excess of "100". Although the device of FIG. 5 operates in substantially the same overall manner as the device of FIG. 1, there are a number of structural differences, which will now be described. It may also be noted by comparing FIGS. 1 and 5 that a number of elements and relationships are reversed in the FIG. 5 embodiment.

The most important difference in the device of FIG. 5 relates to the viscous coupling, generally designated 101, which is disposed radially inward from the ball ramp actuator 21. The viscous coupling includes an input housing 103, which is connected to the inner periphery of the first ramp plate 41, such as by splines or any other suitable means. The coupling 101 also includes an output housing 105, fixed to rotate with the output shaft 13. Disposed within the coupling 101 is a plurality of interleaved plates 107 and 109, the plates 107 being splined to the housing 103, and the plates 109 being splined to the housing 105. Within the coupling 101, viscous shear torque is generated in response to slip speed between the first ramp plate 41 and the output shaft 13, such that the coupling 101 is, in effect, on the downstream side of the ball ramp actuator 21.

It is an important aspect of the invention that the ball ramp actuator 21 and the viscous coupling 19 or 101 be "nested", i.e., with the viscous coupling either disposed radially within the actuator 21 or surrounding the actuator 21, thus foreshortening the overall device. In either case, one element of the viscous coupling, either the input or the output, is in operative engagement with the first ramp plate 41, at either the radially inner or radially outer periphery of the plate 41.

In the device of FIG. 5, there is a plurality of the generally cylindrical members 83, but unlike the device of FIG. 1, in the device of FIG. 5, the members 83 are disposed between the housing 17 and the outer friction discs 71. In the device of FIG. 5, the inner friction discs 73 and preferably splined to the output shaft 13 in a conventional manner, by means of external splines 111 on the outer periphery of the output shaft 13. Otherwise, the members serve the similar function to those in the FIG. 1 embodiment. In FIG. 5, the members 83 serve as the connection means of the friction discs 71 to the housing 17, and also prevent the ball ramp actuator 21 from going over-center after the friction discs wear a certain amount. Finally, the springs 87, biasing the members 83 to the right in FIG. 5, tend to bias the ball ramp actuator toward its centered, neutral position.

Another difference in the FIG. 5 embodiment is that the clutch pack 23 and the ball ramp actuator 21 are "self-contained" as in the device of FIG. 1, but in the device of FIG. 5 they are self-contained relative to the housing 17. Toward the front (right end in FIG. 5) of the housing 17, there is a snap ring 113 seated within a groove on the inner periphery of the housing 17, and disposed adjacent the snap ring 113 is an annular retaining plate 115. The first ramp plate 41 is supported relative to the retaining plate 115 by means of the thrust bearing set 59, as in FIG. 1. Thus, those elements in which substantial axial force is generated are retained and contained relative to a single member, in this case the housing 17.

In operation, the device of FIG. 5 receives input at the forward end cap 15, as does the device of FIG. 1, and as long as there is no speed difference across the device, no viscous shear torque is being generated within the coupling 101, and the ball ramp actuator 21 remains in neutral. As, by way of example, the front wheels spin out, a viscous shear drag will be generated on the plates 107, thus tending to retard the rotation of the first ramp plate 41, relative to the second ramp plate 47. As a result, the plates 41 and 47 will ramp up, thus compressing the friction discs 71 and 73, and transmitting torque from the housing 17 to the output shaft 13, as in the device of FIG. 1.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential device including an input adapted to receive input torque, an output adapted to provide driving torque to an output device, and a clutch pack including at least a first friction disc fixed to rotate with said input, and at least a second friction disc fixed to rotate with said output; means operable to move said friction discs between a disengaged position and an engaged position, said means comprising a cam ramp actuator including first and second ramp plates, and a plurality of cam members, each operably disposed between said first and second ramp plates, and in engagement with first and second ramp surfaces, respectively; said second ramp plate being disposed axially adjacent said friction discs and being operable to move said friction discs toward said engaged position; said means operable to move said friction discs further comprising a viscous coupling including an input coupling member fixed to rotate with said input, and an output coupling member; characterized by:

(a) said output comprising a shaft member extending axially through said clutch pack and at least partially through said cam ramp actuator;
   (b) first retention means in engagement with one of said input and said shaft member and operable to limit axial movement of said first ramp plate in a forward direction, relative to said one of said input and said shaft member;
   (c) whereby substantially all axial separation forces within said clutch pack and said cam ramp actuator are taken up within said one of said input and said shaft member.

2. A differential device as claimed in claim 1, characterized by second retention means in engagement with said one of said input and said shaft member and operable to limit axial movement of said clutch pack in a rearward direction, relative to said shaft member.

3. A differential device as claimed in claim 1, characterized by said first retention means comprising a generally plate-like member disposed forwardly of said first ramp plate.

4. A differential device as claimed in claim 3, characterized by a snap ring in fixed engagement with said one of said input and said shaft member and operable to limit axial movement of said plate-like member in a forward direction, relative to said one of said input and said shaft member.

5. A differential device as claimed in claim 3, characterized by thrust bearing means disposed axially between said plate-like member and said first ramp plate.

6. A differential device including an input adapted to receive input torque, an output adapted to provide driving torque to an output device, and a clutch pack including at least a first friction disc fixed to rotate with said input, and at least a second friction disc fixed to rotate with said output; means operable to move said friction discs between a disengaged position and an engaged position, said means comprising a cam ramp actuator including first and second ramp plates, and a plurality of cam members, each operably disposed between said first and second ramp plates, and in engagement with first and second ramp surfaces, respectively; said second ramp plate being disposed axially adjacent said friction discs and being operable to move said friction discs toward said engaged position; said means operable to move said friction discs further comprising a viscous coupling including an input coupling member fixed to rotate with said input, and an output coupling member; characterized by:

(a) one of said input and said output defining a plurality of N elongated cut-out portions on the outer periphery thereof;

(b) one of said first friction disc and said second friction disc defining a plurality N of cut-out portions cooperating with said elongated cut-out portions defined by said one of said input and said output to define a plurality N of openings;

(c) a plurality N of elongated members, each member disposed in one of said openings, and operable to transmit torque between said one of said first friction disc and said second friction disc and said one of said input and said output; and (d) said openings having an axial length L1, and each of said elongated members having an axial length L2, less than L1, the difference therebetween being selected such that wear within said clutch pack will permit L1 to decrease to L2, but will prevent said cam ramp actuator from moving to an over-center condition.

7. A differential device as claimed in claim 6, characterized by first and second plate-like members being disposed at opposite axial ends of said clutch pack, the axial distance between said plate-like members, when said clutch pack is in said engaged position, comprising said axial length L1.

8. A differential device as claimed in claim 7, characterized by each of said plurality N of openings being generally cylindrical, and each of said plurality N of elongated members being generally cylindrical.

9. A differential device as claimed in claim 8, characterized by each of said plurality N of elongated members being at least partially hollow, and a compression spring disposed within each elongated member, said compression springs exerting an axial force operable to bias said cam ramp actuator toward a centered position.

* * * * *